(12) United States Patent
Shiao et al.

(10) Patent No.: US 9,631,367 B2
(45) Date of Patent: Apr. 25, 2017

(54) SYSTEM, METHOD AND APPARATUS FOR INCREASING SURFACE SOLAR REFLECTANCE OF ROOFING

(71) Applicants: Ming Liang Shiao, Collegeville, PA (US); Husnu M. Kalkanoglu, Swarthmore, PA (US); George Gregory Wattman, Malvern, PA (US)

(72) Inventors: Ming Liang Shiao, Collegeville, PA (US); Husnu M. Kalkanoglu, Swarthmore, PA (US); George Gregory Wattman, Malvern, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

(21) Appl. No.: 13/841,401

(22) Filed: Mar. 15, 2013

(65) Prior Publication Data

US 2013/0202852 A1 Aug. 8, 2013

Related U.S. Application Data

(63) Continuation-in-part of application No. 13/558,034, filed on Jul. 25, 2012.
(Continued)

(51) Int. Cl.
*E04D 1/28* (2006.01)
*E04D 5/12* (2006.01)
(Continued)

(52) U.S. Cl.
CPC ............... *E04D 1/28* (2013.01); *B32B 11/12* (2013.01); *E04D 1/20* (2013.01); *E04D 5/12* (2013.01);
(Continued)

(58) Field of Classification Search
CPC ......... B32B 11/02; B32B 37/24; B32B 11/10; B32B 17/04; B32B 11/12; B32B 9/002;
(Continued)

(56) References Cited

U.S. PATENT DOCUMENTS 1,969,074 A 8/1934 Harshberger
2,046,295 A 6/1936 Nichols
(Continued)

FOREIGN PATENT DOCUMENTS

DE 2018304 A1 2/1972
DE 9405349 U1 6/1994
(Continued)

OTHER PUBLICATIONS

U.S. Appl. No. 13/629,282, filed Sep. 27, 2012, Inventors: Rosiana Aguiar et al.
(Continued)

*Primary Examiner* — Nathan Van Sell
(74) *Attorney, Agent, or Firm* — Abel Law Group, LLP; Alexander H. Plache (57) ABSTRACT

A roofing product has a substrate having a binder layer and roofing granules on a majority of the binder layer, such that an exposed portion of the binder layer does not have the roofing granules. In addition, particles may be located on the exposed portion of the binder layer. The particles are smaller in size than the roofing granules, and the reflective particles have a solar reflectance of greater than 10%.

14 Claims, 6 Drawing Sheets

Related U.S. Application Data (60) Provisional application No. 61/515,391, filed on Aug. 5, 2011.

(51) Int. Cl.
  *E04D 1/20* (2006.01)
  *B32B 11/12* (2006.01)
  *E04D 1/00* (2006.01)

(52) U.S. Cl.
  CPC ...... *B05D 2252/02* (2013.01); *B05D 2401/32* (2013.01); *B05D 2451/00* (2013.01); *E04D 2001/005* (2013.01); *Y02B 80/34* (2013.01); *Y10T 428/2443* (2015.01); *Y10T 428/24372* (2015.01); *Y10T 428/24388* (2015.01); *Y10T 428/24405* (2015.01); *Y10T 428/24413* (2015.01); *Y10T 428/24421* (2015.01)

(58) Field of Classification Search
  CPC ............ B32B 2419/06; B32B 2255/04; B32B 2255/20; B32B 2262/101; B32B 2307/404; E04D 1/22; E04D 1/26; E04D 5/12; E04D 2001/005; Y02B 80/34; Y10T 428/24421; Y10T 428/24413; Y10T 428/24372; Y10T 428/24388; Y10T 428/24405; Y10T 428/2443
  USPC ............ 428/141–150; 427/186–188; 52/518, 52/535, 543
  See application file for complete search history.

(56) References Cited

U.S. PATENT DOCUMENTS

| | | |
|---|---|---|
| 2,197,895 A | 4/1940 | Nichols |
| 2,202,002 A | 5/1940 | Harshberger et al. |
| 2,234,446 A | 3/1941 | Murphy |
| 2,294,930 A | 9/1942 | Palmquist |
| 2,321,674 A | 6/1943 | Harshberger et al. |
| 2,332,220 A | 10/1943 | Harshberger |
| 2,332,221 A | 10/1943 | Harshberger |
| 2,378,927 A | 6/1945 | Jewett |
| 2,569,134 A | 9/1951 | Reed |
| 2,695,851 A | 11/1954 | Lodge |
| 2,729,574 A | 1/1956 | Schwarz |
| 2,732,311 A | 1/1956 | Hartwright |
| 2,749,250 A | 6/1956 | Christensen et al. |
| 3,001,331 A | 6/1959 | Brunton |
| 2,951,770 A | 9/1960 | Lodge et al. |
| 3,169,075 A | 2/1965 | Morrow, Jr. et al. |
| 3,207,619 A | 9/1965 | Klimboff |
| 3,216,883 A | 11/1965 | Bick et al. |
| 3,288,618 A | 11/1966 | De Vries |
| 3,291,011 A | 12/1966 | Defregger et al. |
| 3,707,432 A | 12/1972 | Corbin |
| 3,964,820 A | 6/1976 | Eigenmann |
| 4,020,211 A | 4/1977 | Eigenmann |
| 4,478,869 A | 10/1984 | Brady et al. |
| 4,717,614 A | 1/1988 | Bondoc et al. |
| 4,749,731 A | 6/1988 | Kyminas et al. |
| 5,053,253 A | 10/1991 | Haenggi et al. |
| 5,124,178 A | 6/1992 | Haenggi et al. |
| 5,206,068 A | 4/1993 | Kalkanoglu |
| 5,283,080 A | 2/1994 | Lamb et al. |
| 5,286,682 A | 2/1994 | Jacobs et al. |
| 5,338,368 A | 8/1994 | Fletcher et al. |
| 5,380,552 A | 1/1995 | George et al. |
| 5,571,596 A | 11/1996 | Johnson |
| 5,941,655 A | 8/1999 | Jacobs et al. |
| 6,326,053 B1 | 12/2001 | Stump et al. |
| 6,479,132 B2 | 11/2002 | Hedblom et al. |
| 6,544,598 B1 | 4/2003 | Swei et al. |
| 6,569,520 B1 | 5/2003 | Jacobs |
| 6,878,666 B2 | 4/2005 | Domen et al. |
| 6,881,483 B2 | 4/2005 | McArdle et al. |
| 6,933,007 B2 | 8/2005 | Fensel et al. |
| 7,125,601 B1 | 10/2006 | Pinault et al. |
| 7,238,408 B2 | 7/2007 | Aschenbeck et al. |
| 7,241,500 B2 | 7/2007 | Shiao et al. |
| 7,291,358 B1 | 11/2007 | Fensel et al. |
| 7,452,598 B2 | 11/2008 | Shiao et al. |
| 7,503,971 B2 | 3/2009 | Wojtysiak et al. |
| 7,592,066 B2 | 9/2009 | Shiao et al. |
| 7,615,512 B2 | 11/2009 | Orth-Gerber et al. |
| 7,846,548 B2 | 12/2010 | Shiao et al. |
| 8,435,599 B1 | 5/2013 | Standeford et al. |
| 8,993,047 B2 | 3/2015 | Standeford et al. |
| 2002/0066233 A1 | 6/2002 | McArdle et al. |
| 2002/0160151 A1 | 10/2002 | Pinault et al. |
| 2002/0169076 A1 | 11/2002 | Takeshi et al. |
| 2003/0059528 A1 | 3/2003 | Swei et al. |
| 2003/0152747 A1 | 8/2003 | Fensel |
| 2004/0071938 A1 | 4/2004 | Fensel |
| 2005/0072110 A1 | 4/2005 | Shiao et al. |
| 2005/0238848 A1 | 10/2005 | Fensel |
| 2006/0159609 A1 | 7/2006 | Gole |
| 2006/0251807 A1 | 11/2006 | Hong et al. |
| 2007/0107372 A1* | 5/2007 | Harrington, Jr. .......... 52/746.11 |
| 2007/0110961 A1* | 5/2007 | Fensel et al. ............... 428/143 |
| 2008/0031832 A1 | 2/2008 | Wakefield et al. |
| 2008/0241472 A1 | 10/2008 | Shiao et al. |
| 2008/0248242 A1 | 10/2008 | Shiao et al. |
| 2010/0047566 A1 | 2/2010 | Viasnoff et al. |
| 2010/0151199 A1 | 6/2010 | Shiao et al. |
| 2010/0190633 A1 | 7/2010 | Bai et al. |
| 2011/0052874 A1 | 3/2011 | Zhou et al. |
| 2011/0086201 A1 | 4/2011 | Shiao et al. |
| 2011/0183112 A1 | 7/2011 | Bailey et al. |

FOREIGN PATENT DOCUMENTS

| | | |
|---|---|---|
| EP | 0901547 A1 | 3/1999 |
| GB | 255477 | 4/1927 |
| GB | 672683 A | 5/1952 |
| GB | 905988 | 9/1962 |
| GB | 1234071 A | 6/1971 |
| GB | 1316444 A | 5/1973 |
| GB | 1362439 A | 8/1974 |
| GB | 559261 | 2/1994 |
| JP | 200148586 | 2/2001 |
| JP | 2006001820 A | 1/2006 |
| WO | 9745607 A1 | 12/1997 |
| WO | 0171121 A1 | 9/2001 |
| WO | 0173242 A1 | 10/2001 |

OTHER PUBLICATIONS

U.S. Appl. No. 13/101,838, filed May 5, 2012, Inventors: Rosiana Aguiar et al.

U.S. Appl. No. 13/558,034, filed Jul. 25, 2012, Inventors: Ming Liang Shiao et al.

Palanivelu et al. (Carbon Doping of TiO2 for Visible Light Photo Catalysis—A review, Carbon Science vol. 8, No. 3, Sep. 2007, pp. 214-224).

* cited by examiner

SYSTEM, METHOD AND APPARATUS FOR INCREASING SURFACE SOLAR REFLECTANCE OF ROOFING

This application is a continuation-in-part of U.S. application Ser. No. 13/558,034, filed Jul. 25, 2012, which claims priority to and the benefit of U.S. Prov. Pat. App. No. 61/515,391, filed Aug. 5, 2011, and is incorporated herein by reference in its entirety.

BACKGROUND OF THE INVENTION

Field of the Disclosure

The present invention relates in general to roofing and, in particular, to a system, method and apparatus for increasing the surface solar reflectance of roofing shingles.

Related Art

It has been shown that surfaces of man-made structures, such as a roofing covering, cladding, or pavement surface, can absorb significant amounts of solar radiation. This causes the so-called "heat island effect," where the temperatures in an urban area tend to be several degrees higher than surrounding areas. As a result, significant amounts of solar heat flux can be absorbed due to those surfaces with low solar reflectivity, particularly on hot summer days. This not only increases the demand for indoor cooling energy, but also contributes to smog formation due to higher surface temperatures. Hence, it is beneficial to have a surface with increased solar reflectance to reduce solar heat gain thereby reducing the heat flux entering building envelopes or reducing surface temperatures for lowering smog formation.

This effect is particularly true for mineral-surfaced bitumen roofing products, such as those described in ASTM D225 and D3462. The bitumen or asphalt-based roof coverings are generally constructed from asphalt-saturated roofing felts and surfaced by pigmented color granules, such as those described in U.S. Pat. No. 4,717,614. However, such roofing granules and the resultant roofing membranes or asphalt shingles are known to have low solar reflectivity and hence will absorb solar heat especially through the near infrared range of the solar spectrum. As a result, it is common to measure temperatures as high as 160 to 170° F. on the surfaces of dark roofing shingles on a sunny day with 80° F. ambient temperatures. In recent years, there have been mineral particle surfaced, asphaltic roofing products that are designed to reduce solar heat absorption. This has been achieved by coloring the surface mineral particles with solar reflective colorants. However, the mineral particles typically cover only about 80% to 95% of the shingle surface. The remaining uncovered area of shingles can still absorb significant amounts of solar radiation. As a result, this exposed, highly absorbing asphalt surface can reduce the total solar reflectance by as much as 20%.

Hence, it would be desirable to have a mineral-surfaced roofing product with an exposed asphalt area that can be covered by reflective media that can fit in between the mineral particles. It would also be desirable to have a process wherein the reflective media can be efficiently deposited onto the exposed asphalt area without affecting granule adhesion or the overall aesthetics of the shingles.

SUMMARY

Embodiments of a roofing product may comprise a substrate having a binder layer and roofing granules on a majority of the binder layer, such that an exposed portion of the binder layer does not have the roofing granules. In addition, reflective particles may be located on the exposed portion of the binder layer. The reflective particles are smaller in size than the roofing granules, and the reflective particles have a solar reflectance of greater than 40%.

In another embodiment, a method of fabricating a roofing product may include coating a substrate with a binder layer, depositing roofing granules on the binder layer of the substrate, and pressing the roofing granules into the binder layer, such that an exposed portion of the binder layer is not covered by the roofing granules to form a subassembly. In addition, the method may include turning the subassembly on a roller such that the subassembly is curved and spaces between the roofing granules are widened, and depositing reflective particles on the widened spaces of the exposed portion of the binder layer, and the reflective particles are smaller than the roofing granules.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and may be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

To improve the total solar reflectance of a mineral particle surfaced roofing product (e.g., a roofing shingle, roofing membrane, or the like), embodiments of a system, method and apparatus are disclosed by which the exposed portion of asphalt surface is substantially covered by reflective particles to increase the solar reflectivity. The shingle is typically made by coating a reinforcement layer followed by deposition of the surfacing mineral particles and pressing the particles to achieve a desirable surface appearance and adhesion.

Figure 1A:
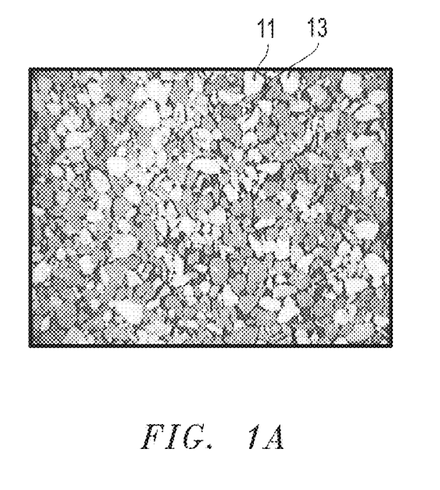
FIGS. 1A and B are top and image analysis views of a conventional roofing shingle.
Figure 1B:
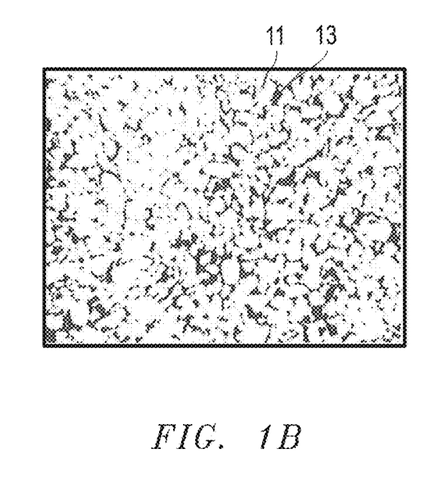
Figure 2A:
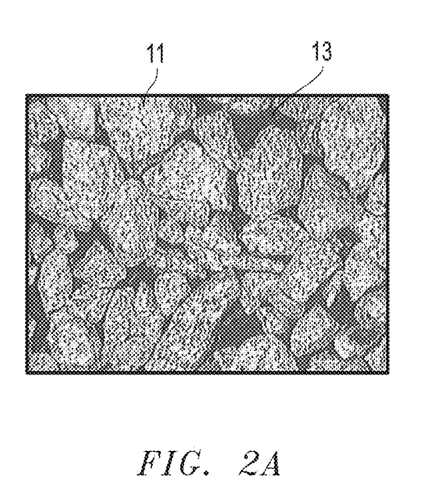
FIGS. 2A and B are enlarged top and image analysis views of another conventional roofing shingle.
Figure 2B:
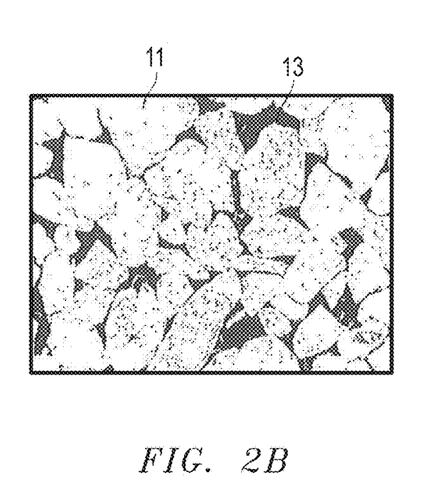

Conventional roofing granules typically cover about 80% to 95% of the surface of a roofing shingle. For example, in the image analysis via digitized micrograph depicted in FIGS. 1 and 2, roofing granules 11 cover most of the underlying bitumen coating or layer 13, which appears as uncovered black patches 13 in FIGS. 1B and 2B.

To cover the remaining exposed portion of the asphalt surface and to improve the overall solar reflectance, a layer of reflective particles 15 (FIG. 3C) is deposited on the exposed portion 13 on the underlying substrate 17, such as a fibrous web. In some embodiments, this step takes place after the deposition of the primary surfacing mineral granules 11, and while the asphalt substrate is sufficiently hot to remain soft and tacky. In another embodiment, deposition of the reflective particles for covering the exposed asphalt surface occurs before the pressing of the primary surfacing mineral particles and before the onset of cooling water.

Figure 3A:
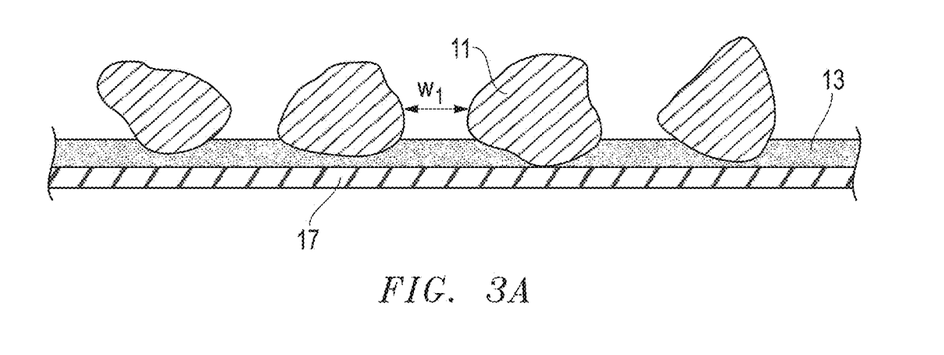
FIGS. 3A-3C are schematic sectional side views of an embodiment of a method of forming a roofing product.
Figure 3B:
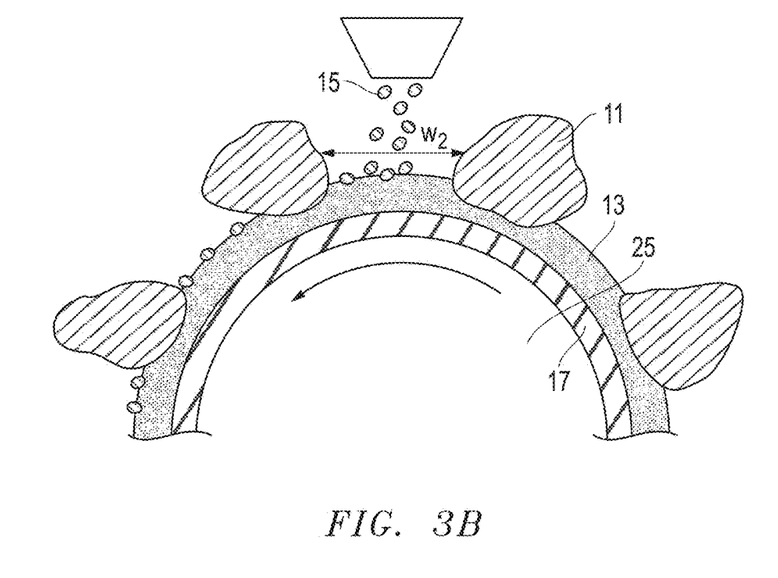
Figure 3C:
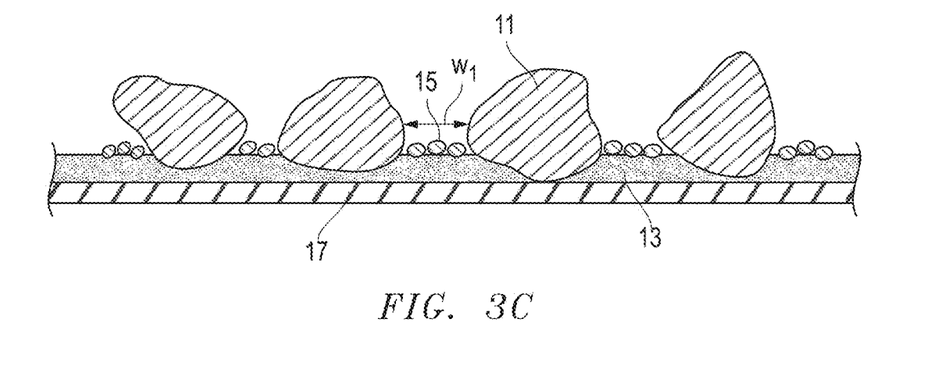

Embodiments of a method of forming a roofing product may include providing the coated substrate 13, 17 with granules 11 (FIG. 3A) in a substantially flat configuration, such that the granules 11 are generally separated by nominal distances or widths $w_1$. The widths between granules 11 are not uniform. Widths $w_1$ are merely representative of the relative spaces between adjacent granules. The coated substrate 13, 17 is subsequently turned (FIGS. 3B, 5B and 5C) on a cylindrical roller 25. The schematic view in FIG. 3B is greatly exaggerated for illustration purposes. While on the roller, the granules 11 are temporarily further separated by widths $w_2$ that exceed widths $w_1$ due to the radius of curvature of the underlying roller 25. The reflective particles 15 may be added to the subassembly at this time, such that they contact the coated substrate 13, 17 when the granules 11 are spaced at widths $w_2$. As shown in FIG. 3C, the final assembly is subsequently returned to a substantially flat configuration wherein the granules 11 are again separated by their nominal widths $w_1$.

Suitable materials for covering the exposed asphalt surface may comprise a desirable particle size range and desirable solar reflectance. The reflective particles may have particle sizes that can fit into the gap between the primary surfacing mineral particles. For example, the particles may have a particle size less than US mesh #30. In other embodiments, the particles may have a particle size less than US mesh #50, or between US mesh #30 and #80. The particle also may have a solar reflectance of greater than 40%, and in other embodiments greater than 70%.

Examples of suitable materials for the reflective particles may comprise crushed quartz granules, crushed calcites, ceramic particles, crushed ceramic grog, sintered clay particles, $TiO_2$ particles, IR reflective pigments, calcined clays, zinc oxide particles, reflective polymer particles, reflective glass spheres, retro-reflective glass beads, reflective mica or thin film coated mica, heat reflective particles, metal flakes, particles or spheres, colored mineral particles, and/or any naturally occurring reflective particles with sufficient reflectivity.

In some embodiments, the reflective particles may be deposited via gravity feed over the web of the asphalt product during the manufacturing of the product. The deposition may be carried out after dropping the primary surfacing mineral particles and before the pressing of the primary surfacing particles. An example of the deposition is depicted in FIG. 4, where the reflective particles 15 are deposited after the web 17 goes around the slate drum 21 and roll 23, and before the first turning roller 25, where the granulated surface is facing upward.

The particle sizes for this application method may range from less than US mesh #30 to larger than #100 U.S. mesh to avoid dusting or air borne particle problems.

Figure 4:
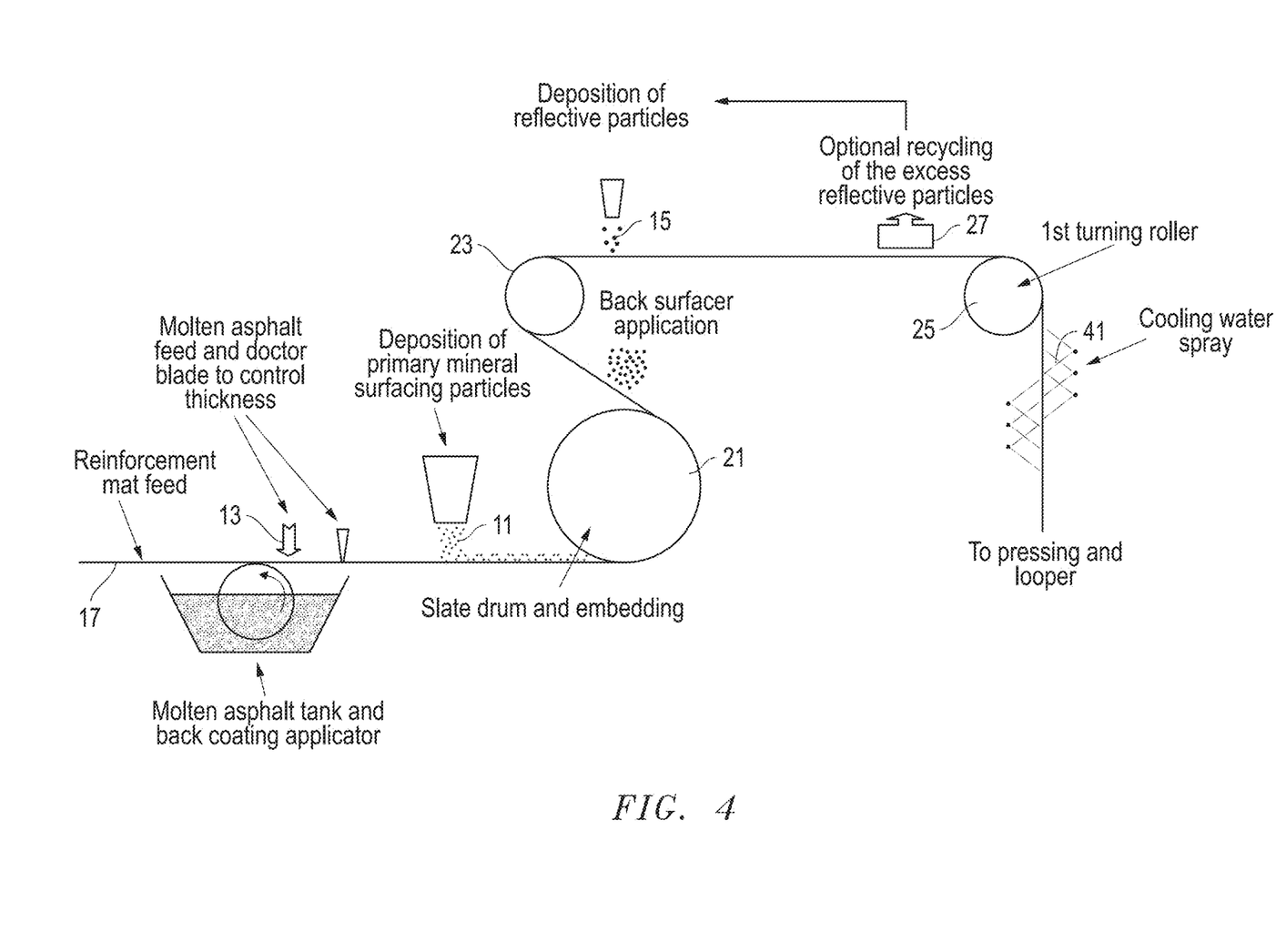
FIGS. 4-6 are schematic diagrams of embodiments of methods of producing roofing products.
Figure 5A:
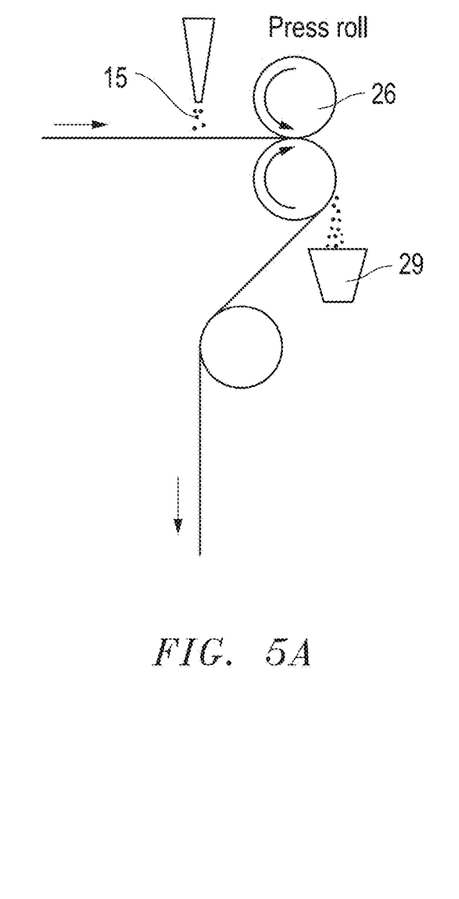
Figure 5B:
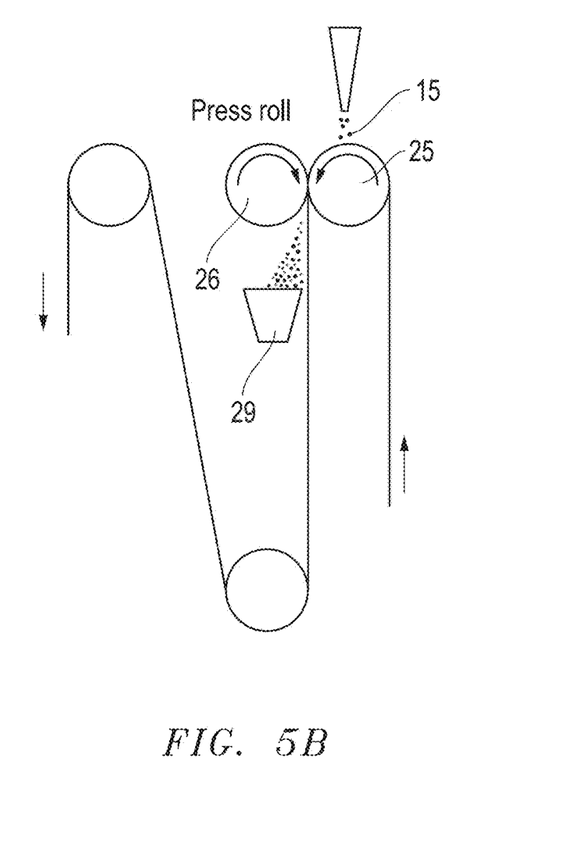
Figure 5C:
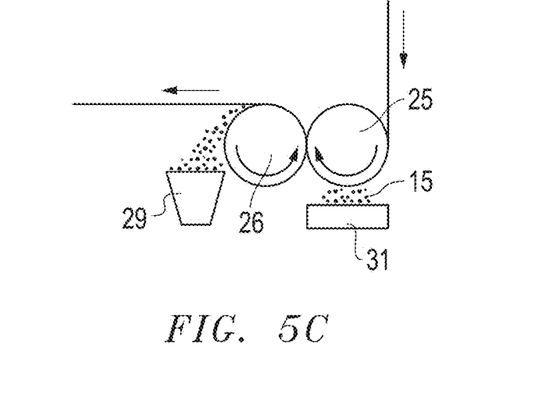

Referring now to FIGS. 4 and 5, a particle recovering system (e.g., vacuum pickup 27 or catch pan 29 after one or more of the turning or press rollers 26) may be employed after the deposition of the reflective particles 15. This allows for recycling the particles and removes excess, unbonded particles to avoid forming a slippery surface on the shingles due to loose particles on their surfaces.

Embodiments of the reflective particles 15 selected for covering the exposed asphalt surface should have good hiding power when deposited as a mono-layer or thin layer on that surface. This is to ensure that the resultant shingle or membrane provides improved solar reflectance by avoiding heat absorption by the asphalt surface. Embodiments of the reflective particles may have an opacity greater than 50%, and/or the CIE color unit $L^*>50$, when deposited as a layer thickness of, for example, 20 mil (500 microns) or less over a substantially black background.

Figure 6:
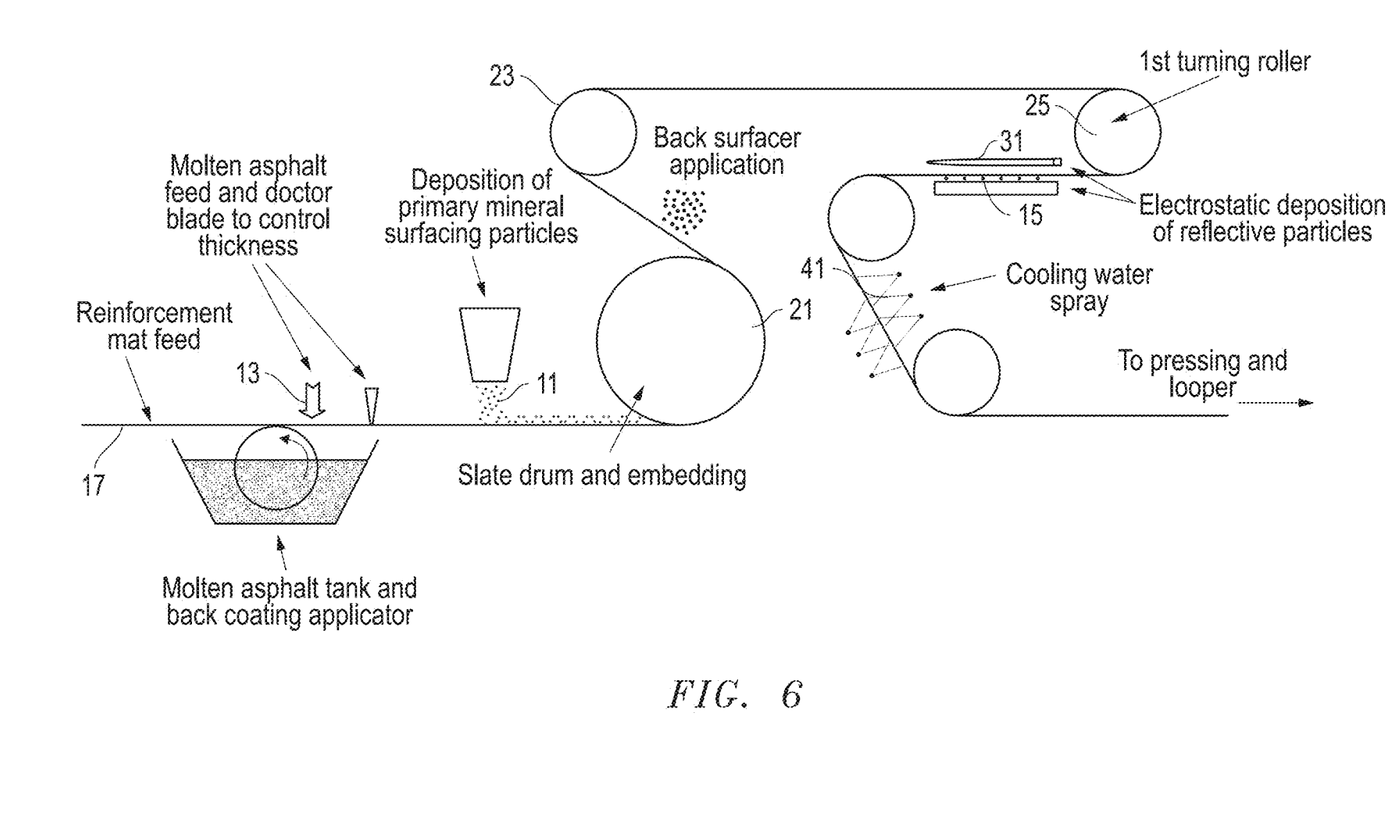

In still other embodiments (FIGS. 5C and 6), the reflective particles 15 may be deposited by an electrostatic deposition process 31. The particles 15 may be energized by electrostatic charge and then attracted to the web 17 of the asphalt product 13 by electrostatic force to complete the deposition process. This process has been used in the bonded abrasive industry and an example is disclosed in U.S. Pat. No. 6,544,598, to Swei, et al, which is incorporated herein by reference in its entirety. For this deposition process, the reflective particles 15 may be deposited after dropping the primary surfacing mineral particles 11, and the bitumen layer 13 of the web 17 of the granulated side faces downward to have the charged reflective particles 15 drawn upward toward the web.

Other embodiments of the reflective particles may be deposited by dispersing them in a liquid media and then spraying the media onto the surface of the web after dropping the primary mineral surfacing particles, as shown and described herein. Suitable liquid media may include, but not be limited to, water, latex, acrylic emulsions, and/or solvent-based coatings. The liquid media may further comprise other additives, such as dispersants, viscosity modifiers, and/or biocides. The reflective particles may be first dispersed in the liquid media via mixing or shearing, and then the mixture may be pumped to a nozzle to be sprayed directly onto the surface of the web of the roofing product. This allows the reflective particles to stick to the surface and also be carried by water or liquid media to the valley or low point of the asphalt surface in between the granules. This deposition may be carried out before the first cooling water spray 41 (FIGS. 4 and 5) during the manufacturing of the roofing product.

In further embodiments, the reflective particles may comprise other components and functionalities, such as algaecides, fungicides, biocides, UV blocking, color, and/or metallic appearance. Still other examples of this disclosure will become apparent to those who are skilled in the art. For example, the reflective particles may comprise zinc oxide, which combines solar reflectance with algae resistance.

The roofing granules may have a wide range of colors including beige, yellow, green, brown, dark gray, and potentially other colors while still having a desired reflectivity and emissivity. The roofing granules may comprise suitable particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as recycled manufactured materials such as crushed bricks, concrete, porcelain, fire clay, and the like.

In another embodiment, particles can be added to fill the interstitial space between roofing granules or covering the exposed asphalt of a roofing product. Particles can be of color thereby allowing for a filled roofing product that maintains the color of the unfilled roofing product.

CIELAB is the second of two systems adopted by CIE in 1976 as models that better showed uniform color spacing in their values. CIELAB is an opponent color system based on the earlier (1942) system of Richard Hunter called L, a, b. Color opposition correlates with discoveries in the mid-1960s that somewhere between the optical nerve and the brain, retinal color stimuli are translated into distinctions between light and dark, red and green, and blue and yellow. CIELAB indicates these values with three axes: L*, a*, and b*. (The full nomenclature is 1976 CIE L*a*b* Space.) The central vertical axis represents lightness (signified as L*) whose values run from 0 (black) to 100 (white). The color axes are based on the fact that a color cannot be both red and green, or both blue and yellow, because these colors oppose each other. On each axis the values run from positive to negative. On the a-a' axis, positive values indicate amounts of red while negative values indicate amounts of green. On the b-b' axis, yellow is positive and blue is negative. For both axes, zero is neutral gray.

For the purposes of this application, articles having a color falling within the inverted conical volume defined by the equation:

$$-(L^*) + \frac{\sqrt{((L_0^*) + (y(a^*)^2 + z(b^*)^2))}}{x} \leq 0 \quad (I)$$

where $L^*_0=67$, $x=1.05$, $y=1.0$, $z=1.0$ and the values, $L^*$, $a^*$, and $b^*$, are defined on the CIE L*a*b* scale are said to be white and articles having a color falling outside the cone are said to be non-white.

Values of the color space corresponding to white fall within the cone close to the vertical L* axis, are not strongly colored as indicated by their small displacements along either or both of the a* and b* axes, and have a relatively high degree of lightness as indicated by an L* greater than $L^*_0$. $L^*_0$ is the vertex of the cone.

The difference or distance between two colors is a metric of interest in color science. It allows people to quantify a notion that would otherwise be described with adjectives, to the detriment of anyone whose work is color critical. Common definitions make use of the Euclidean distance in a device independent color space. The International Commission on Illumination (CIE) calls their distance metric $\Delta E^*_{ab}$ (also called $\Delta E^*$) used to denote difference of color sensation. Different studies have proposed different $\Delta E$ values that have a JND (just noticeable difference). For roofing products comprising a granular material on asphalt, the products begin to show a JND between $\Delta E$'s of 2.5 and 3.0. These non-uniformities are important because the human eye is more sensitive to certain colors than others. A good metric should take this into account in order for the notion of a "just noticeable difference" to have meaning. Otherwise, a certain $\Delta E$ that may be insignificant between two colors that the eye is insensitive to may be conspicuous in another part of the spectrum. The 1976 formula is the first color-difference formula that related a measured to a known Lab value. Using $(L^*_2, a^*_2, b^*_2)$ and $(L^*_1, a^*_1, b^*_1)$ of two colors in L*a*b*, $\Delta E$ is:

$$\Delta E^* = \sqrt{(L^*_2-L^*_1)^2+(a^*_2-a^*_1)^2+(b^*_2-b^*_1)^2}$$

For $\Delta E$ of 3.0 or less there is generally no noticeable difference between the colors, while for a $\Delta E$ of more than 3.0, a color difference becomes noticeable. Since the choice of sand particles varies across the color spectrum and only a small percentage of the shingle comprises exposed asphalt, the color change can be noticeable at lower $\Delta E$, such as at not greater than 2.8, not greater than 2.6, not greater than 2.4, not greater than 2.2, not greater than 2.0, not greater than 1.8, not greater than 1.6, or not greater than 1.4.

Also, the color change is dependent from the amount of particles applied to the roofing product. In embodiments, the amount can range from 0.02 g/in² to 0.2 g/in², such from 0.04 g/in² to 0.16 g/in², from 0.06 g/in² to 0.12 g/in², or 0.08 g/in² to 0.1 g/in².

For a noticeable color change, the $\Delta E$'s are greater than 3.0, such as greater than 3.2, greater than 3.4, greater than 3.6, greater than 3.8, greater than 4.0, greater than 4.2, greater than 4.4, greater than 4.6, greater than 4.8, greater than 5.0, greater than 5.2, greater than 5.4, greater than 5.6, greater than 5.8, or greater than 6.0. Given the limited area of exposed asphalt a maximum of $\Delta E$'s are not greater than 12.0, such as not greater than 11.7, not greater than 11.5, not greater than 11.3, not greater than 11.0, not greater than 10.7, not greater than 10.5, not greater than 10.3, not greater than 10.0, not greater than 9.7, not greater than 9.5, not greater than 9.3, not greater than 9.0, not greater than 8.7, not greater than 8.5, not greater than 8.3, or not greater than 8.0.

In a first aspect, a roofing product comprises a substrate having a bitumen layer. The roofing product can comprise roofing granules on a majority of the bitumen layer. An exposed portion of the bitumen layer may not have the roofing granules. The roofing product can include particles on the exposed portion of the bitumen layer. The particles can be smaller in average size than the roofing granules. The particles can have a solar reflectance of greater than 10%. The solar reflectance may not be greater than 45%. A major surface of the roofing product can have a $\Delta E^*$ of less than 3.0 compared to an analogous major surface of a roofing product lacking particles.

In one embodiment, the roofing granules can be on about 80% to 95% of the bitumen layer and the particles can cover substantially all of the exposed portion of the bitumen layer. In another embodiment, the roofing granules can have a particle size between #8 and #50 U.S. mesh, and the particles have a particle size in a range of #30 and #80 U.S. mesh. In one further embodiment, the roofing granules can have a particle size between #10 and #40 U.S. mesh, and the particles have a particle size in a range of #50 to #80 U.S. mesh. In yet another embodiment, the particles can have a particle size in a range from #30 to #100 U.S. mesh. In one embodiment, the particles can have a particle size between #50 and #80 U.S. mesh.

In one embodiment, the particles can have a solar reflectance of greater than 20%, such as greater than 22%, greater than 24%, greater than 26%, greater than 28%, greater than 30%, greater than 32%, greater than 34%, greater than 36%, greater than 38%, or greater than 40%.

In one embodiment, the particles can include at least one of crushed quartz granules, crushed calcites, ceramic particles, crushed ceramic grog, sintered clay particles, $TiO_2$ particles, infrared reflective pigments, calcined clays, ZnO particles, reflective polymer particles, reflective glass spheres, retro-reflective glass beads, reflective mica or thin film coated mica, heat reflective particles, metal flakes, metal particles, metal spheres and colored mineral particles. In one further embodiment, the particles further can include at least one of an algaecide, fungicide, biocide, UV blocking, color, and metallic appearance.

In one embodiment, the reflective particles can have an opacity greater than 50%, such as greater than 52%, greater than 54%, greater than 56%, greater than 58%, greater than 60%, greater than 62%, greater than 64%, greater than 66%, greater than 68%, or greater than 70%.

In one embodiment, the roofing product can have a $\Delta E^*$ of less than 2.5, such as less than 2.4, less than 2.3, less than 2.2, less than 2.1, less than 2.0, less than 1.9, less than 1.8, less than 1.7, less than 1.6, less than 1.5, less than 1.4, less than 1.3, less than 1.2, or less than 1.0.

In one embodiment, the roofing product can have a color according to the formula:

$-(L^*)+[((L_o^*)+(y(a^*)^2+z(b^*)^2)^{1/2}/x]\leq 0$, wherein $L^*$, $a^*$, $b^*$ are 1976 CIELAB color space parameter of the roofing product, and $L_o>50$, $x\geq 1$, $y\geq 1$, and $z\geq 1$. In another embodiment, the roofing product can have a color according to the above formula, wherein $L_o^*$ can be 70, 67, 65, 63, 50, 57, 55, or 53; x can be 1.03, 1.05, 1.07, or 1.1; y can be 1.0, 1.05, 1.1, or 1.15, and z can be 1.0, 1.05, 1.1, or 1.15.

In one further embodiment, the solar reflectance of the particle is not greater than 40%, such as not greater than 38%, not greater than 36%, or not greater than 34%. In yet further embodiments, the roofing product can be selected from the group consisting of a roofing membrane and a shingle. In one particular embodiment, the roofing product is a shingle. In another particular embodiment, the roofing product is a roofing membrane.

In another aspect, a roofing product, can include a substrate having a bitumen layer. The roofing product can further include roofing granules on a majority of the bitumen layer, such that an exposed portion of the bitumen layer does not have the roofing granules. The roofing product can further include particles on the exposed portion of the bitumen layer, the particles are smaller in average size than the roofing granules. The particles can have a solar reflectance of greater than 10% and not greater than 40%. A major surface of the roofing product can have a $\Delta E^*$ of greater than 3.0 and less than 11.5 compared to an analogous major surface of a roofing product lacking particles.

20. The roofing product according to claim 19, wherein the roofing granules are on about 80% to 95% of the bitumen layer, and the particles cover substantially all of the exposed portion of the bitumen layer.

In one embodiment, the roofing granules can be on about 80% to 95% of the bitumen layer and the particles can cover substantially all of the exposed portion of the bitumen layer. In another embodiment, the roofing granules can have a particle size between #8 and #50 U.S. mesh, and the particles have a particle size in a range of #30 and #80 U.S. mesh. In one further embodiment, the roofing granules can have a particle size between #10 and #40 U.S. mesh, and the particles have a particle size in a range of #50 to #80 U.S. mesh. In yet another embodiment, the particles can have a particle size in a range from #30 to #100 U.S. mesh. In one embodiment, the particles can have a particle size between #50 and #80 U.S. mesh.

In one embodiment, the particles can have a solar reflectance of greater than 20%, such as greater than 22%, greater than 24%, greater than 26%, greater than 28%, greater than 30%, greater than 32%, greater than 34%, greater than 36%, greater than 38%, or greater than 40%.

In one embodiment, the particles can include at least one of crushed quartz granules, crushed calcites, ceramic particles, crushed ceramic grog, sintered clay particles, $TiO_2$ particles, infrared reflective pigments, calcined clays, ZnO particles, reflective polymer particles, reflective glass spheres, retro-reflective glass beads, reflective mica or thin film coated mica, heat reflective particles, metal flakes, metal particles, metal spheres and colored mineral particles.

In one further embodiment, the particles further can include at least one of an algaecide, fungicide, biocide, UV blocking, color, and metallic appearance.

In one embodiment, the reflective particles can have an opacity greater than 50%, such as greater than 52%, greater than 54%, greater than 56%, greater than 58%, greater than 60%, greater than 62%, greater than 64%, greater than 66%, greater than 68%, or greater than 70%.

In one embodiment, the roofing product can have a $\Delta E^*$ of greater than 3.5, such as greater than 4.0, greater than 4.5, greater than 5.0, greater than 5.5, greater than 6.0, greater than 6.5, greater than 7.0, greater than 7.5, greater than 8.0, greater than 8.5, greater than 9.0, or greater than 9.5.

In one embodiment, the roofing product can have a color according to the formula:

$-(L^*)+[((L_o^*)+(y(a^*)^2+z(b^*)^2)^{1/2}/x]\leq 0$, wherein $L^*$, $a^*$, $b^*$ are 1976 CIELAB color space parameter of the roofing product, and $L_o>50$, $x\geq 1$, $y\geq 1$, and $z\geq 1$. In another embodiment, the roofing product can have a color according to the above formula, wherein $L_o^*$ can be 70, 67, 65, 63, 50, 57, 55, or 53; x can be 1.03, 1.05, 1.07, or 1.1; y can be 1.0, 1.05, 1.1, or 1.15, and z can be 1.0, 1.05, 1.1, or 1.15.

In another aspect, a method of improving solar reflectance of a roofing shingle can include coating a substrate with bitumen. The method can further include depositing roofing granules on the bitumen layer of the substrate. The method can include pressing the roofing granules into the bitumen layer, such that an exposed portion of the bitumen layer is not covered by the roofing granules to form a subassembly. The method can include turning the subassembly on a roller such that the subassembly is curved and spaces between the roofing granules are widened. The method can further include depositing particles on the widened spaces of the exposed portion of the bitumen layer, and the particles are smaller than the roofing granules, wherein the particles have a solar reflectance greater than 10%.

In one embodiment, deposition of the particles occurs before the roofing granules are pressed. In another embodiment, the method includes pressing the particles into the bitumen surface to form an assembly and cooling the assembly. In another embodiment, the particles are deposited before cooling. In yet another embodiment, the particles can be deposited via gravity feed. In another embodiment, the particles can be electrostatically deposited.

In one embodiment, during particle deposition, the bitumen layer can face downward and the particles are drawn upward to the bitumen layer. In another embodiment, the method can further include recovering at least some of the particles after deposition. At least some of the particles are recovered via vacuum pickup or catch pan after a roller. In one embodiment, the particles can be dispersed in a liquid media and then deposited. The liquid media can include at least one of water, latex, acrylic emulsion and a solvent-based coating. The liquid media can have an additive comprising at least one of a dispersant, viscosity modifier and biocide. In one embodiment, the particles can further include at least one of an algaecide, fungicide, biocide, UV blocker, color, and metallic appearance.

In another aspect, a method of protecting interstitial space between granules on a major surface of a roofing product, can include coating a substrate with a binder layer. The method can further include depositing roofing granules on the binder layer of the substrate. The method can further include pressing the roofing granules into the binder layer, such that an exposed portion of the binder layer is not covered by the roofing granules to form a subassembly. The method can include turning the subassembly on a roller such that the subassembly is curved and spaces between the roofing granules are widened. The method can include depositing particles on the widened spaces of the exposed portion of the binder layer, and the particles are smaller than the roofing granules. The particles can have a color according to the formula:

$-(L^*)+[((L_o^*)+(y(a^*)^2+z(b^*)^2)^{1/2}/x] \leq 0$, wherein $L^*$, $a^*$, $b^*$ are 1976 CIELAB color space parameter of the particles, and $L_o > 50$, $x \geq 1$, $y \geq 1$, and $z \geq 1$. In another embodiment, the roofing product can have a color according to the above formula, wherein $L_o^*$ can be 70, 67, 65, 63, 50, 57, 55, or 53; x can be 1.03, 1.05, 1.07, or 1.1; y can be 1.0, 1.05, 1.1, or 1.15, and z can be 1.0, 1.05, 1.1, or 1.15.

In one embodiment, the deposition of the particles can occur before the roofing granules are pressed. In one embodiment, the method can further include pressing the particles into the binder layer to form an assembly and cooling the assembly. The particles can be deposited before cooling. In another embodiment, the particles can be deposited via gravity feed. In yet one further embodiment, the particles can be electrostatically deposited.

In one embodiment, during particle deposition, the binder layer faces downward and the particles are drawn upward to the binder layer. In another embodiment, the method can further comprise recovering at least some of the particles after deposition. For example, some of the particles can be recovered via vacuum pickup or catch pan after a roller.

In an embodiment, the particles can be dispersed in a liquid media and then deposited. The liquid media comprises at least one of water, latex, acrylic emulsion and a solvent-based coating. Moreover, the liquid media can have an additive comprising at least one of a dispersant, viscosity modifier and biocide. In one embodiment, the particles further comprise at least one of an algaecide, fungicide, biocide, UV blocker, color, and metallic appearance.

In one embodiment, the particles can have a color according to the formula:

$-(L^*)+[((L_o^*)+(y(a^*)^2+z(b^*)^2)^{1/2}/x] 1 \leq 0$, wherein $L^*$, $a^*$, $b^*$ are 1976 CIELAB color space parameter of the particles, and $L_o^* > 50$, $x \geq 1$, $y \geq 1$, and $z \geq 1$. In a particular embodiment, $L_o^* = 67$, $x = 1.05$, $y = 1.0$, and $z = 1.0$. In one embodiment, the particles are non-white.

In yet another aspect, a method of protecting interstitial space between granules on a major surface of a roofing product can include coating a substrate with a binder layer. The method can further include depositing roofing granules on the binder layer of the substrate. The method can further include pressing the roofing granules into the binder layer, such that an exposed portion of the binder layer is not covered by the roofing granules to form a subassembly. Moreover, turning the subassembly on a roller such that the subassembly is curved and spaces between the roofing granules are widened, while depositing particles on the widened spaces of the exposed portion of the binder layer. The particles can be smaller than the roofing granules, wherein the roofing product has a color according to the formula:

$-(L^*)+[((L_o^*)+(y(a^*)^2+z(b^*)^2)^{1/2}/x] \leq 0$, wherein $L^*$, $a^*$, $b^*$ are 1976 CIELAB color space parameter of the roofing product, and $L_o^* > 50$, $x \geq 1$, $y \geq 1$, and $z \geq 1$. In one particular embodiment, $L_o^* = 67$, $x = 1.05$, $y = 1.0$, and $z = 1.0$.

Example 1

Samples of modified bitumen membrane (e.g., Flinlastic GTA cap sheet, available from CertainTeed Corp., Little Rock, Ariz.) with Energy Star rated solar reflectance of 65% were filled with two types of reflective particles to cover the exposed asphalt between roofing granules. A bitumen membrane sample of size 12"×12" was first heated in a forced-air oven to 80° C. to simulate the product temperature during the manufacturing of the membrane prior to press rolls. In one example, about 10 g of reflective particles of ceramic grog (e.g., 90A from Maryland Refractory, Irondale, Ohio) having solar reflectance >70%, and a size of passing #40 mesh were sprinkled onto the sheet, and then pressed by a 20 lb roller to press them into the gap in between the granules. The sample was then flipped over to remove excess particles. In the same manner, a second sample was prepared by filling the gaps with white colored quartz sand (e.g., SpectraQuartz available from Fairmount Minerals, Chardon, Ohio). The results are shown in Table 1. The solar reflectance of the control or unfilled sample was increased by filling the gap between the granules.

TABLE 1

|  | Control | Sample A | Sample B |
| --- | --- | --- | --- |
| Reflective Particle Media | none | Ceramic grog | Quartz sand |
| Amount Added | — | 3.74 g | 4.43 g |
| Solar Reflectance reading #1 | 0.65 | 0.675 | 0.668 |
| Solar Reflectance reading #2 | 0.639 | 0.673 | 0.667 |
| Solar Reflectance reading #3 | 0.638 | 0.681 | 0.68 |
| Solar Reflectance reading #4 | 0.663 | 0.667 | 0.677 |
| Solar Reflectance reading #5 | 0.645 | 0.667 | 0.663 |
| Solar Reflectance reading #6 | 0.643 | 0.665 | 0.69 |
| Solar Reflectance reading #7 | 0.649 | 0.681 | 0.685 |
| Solar Reflectance reading #8 | 0.629 | 0.673 | 0.686 |
| Solar Reflectance reading #9 | 0.637 | 0.663 | 0.683 |
| Solar Reflectance reading #10 | 0.655 | 0.665 | 0.702 |
| Solar Reflectance reading #11 | 0.636 | 0.688 | 0.665 |
| Solar Reflectance reading #12 | 0.646 | 0.678 | 0.67 |
| Solar Reflectance reading #13 | 0.645 | 0.674 | 0.67 |
| Solar Reflectance reading #14 | 0.658 | 0.676 | 0.69 |
| Solar Reflectance reading #15 | 0.654 | 0.665 | 0.674 |
| Solar Reflectance reading #16 | 0.642 | 0.663 | 0.684 |
| Solar Reflectance reading #17 | 0.625 | 0.68 | 0.687 |
| Solar Reflectance reading #18 | 0.638 | 0.68 | 0.676 |
| Solar Reflectance reading #19 | 0.647 | 0.665 | 0.669 |
| Solar Reflectance reading #20 | 0.641 | 0.665 | 0.682 |
| Averaged Solar Reflectance | 0.6440 | 0.6722 | 0.6784 |

Example 2

Figure 7:
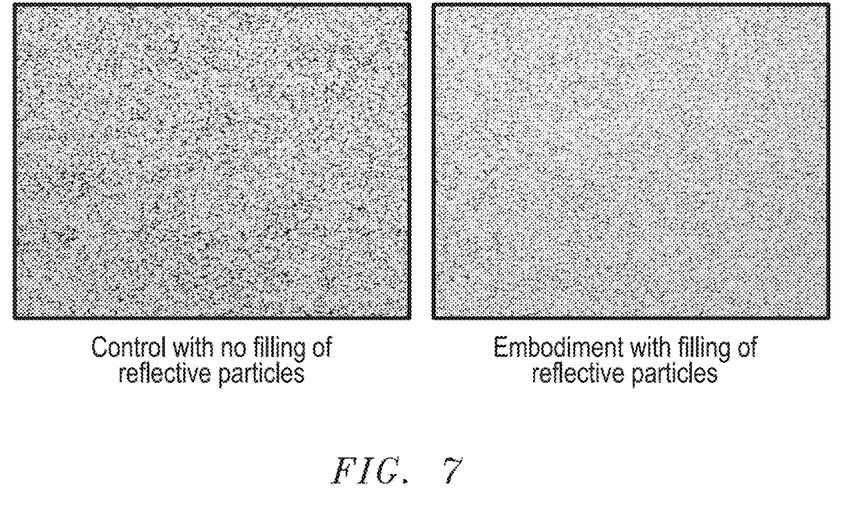
FIGS. 7 and 8 are side-by side photographs showing, on the left, conventional roofing products with no filling of reflective particles and, on the right, embodiments of a roofing product filled with reflective particles.
Figure 8:
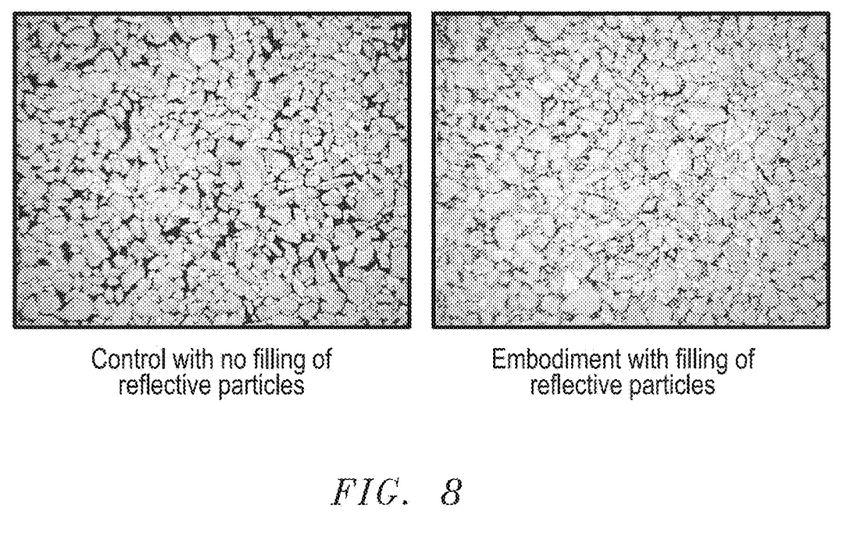

Roofing membranes with and without the reflective particles filling the gap between the granules were produced according to a typical roofing membrane manufacturing process. FIGS. 7 and 8 are side-by side photographs showing, on the left, conventional roofing products with no filling of reflective particles and, on the right, embodiments of a roofing product filled with reflective particles.

These roofing products were produced by coating a fiberglass mat with APP-modified asphalt and then roofing granules having a solar reflectance of 71% (measured by ASTM C1549 method) were deposited onto the molten asphalt running at a speed of 120 feet/minute. The resultant composite was then wound through a series of rollers to reclaim granules that were not embedded into the modified bitumen. The membrane was then cooled to a surface temperature of 160° F. prior to the application of a reflective filler. The reflective filler was of ceramic grog nature (available from CertainTeed Corp., Little Rock, Ariz.) with a solar reflectance of greater than 78%. The reflective filler was then applied to the membrane by first bending the membrane to open up a gap, followed by gravity feed of the reflective particles via vibratory feeder, and them closing the gap by bending the membrane back. The resultant membrane was then pressed by press rolls at 20 psi. The setting of the press was adjusted according to the surface temperature and the run rate to maximize the adhesion of the particles and granules. For the conventional sample without the reflective particle filling, the vibratory feeder was turned off and the sample was then collected as a control case.

Table 2 lists the data of the solar reflectance from the samples obtained from the above-mentioned process.

TABLE 2

|  | Sample #1 Control - no reflective particle filling | Sample #2 Reflective particle filling with ceramic grog at 2 lb/100 ft² |
| --- | --- | --- |
| solar reflectance reading #1 | 0.66 | 0.694 |
| solar reflectance reading #2 | 0.655 | 0.695 |
| solar reflectance reading #3 | 0.643 | 0.703 |
| solar reflectance reading #4 | 0.644 | 0.703 |
| solar reflectance reading #5 | 0.662 | 0.699 |
| solar reflectance reading #6 | 0.646 | 0.728 |
| solar reflectance reading #7 | 0.653 | 0.726 |
| solar reflectance reading #8 | 0.663 | 0.717 |
| solar reflectance reading #9 | 0.651 | 0.691 |
| solar reflectance reading #10 | 0.661 | 0.704 |
| solar reflectance reading #11 | 0.659 | 0.693 |
| solar reflectance reading #12 | 0.649 | 0.693 |
| solar reflectance reading #13 | 0.659 | 0.695 |
| solar reflectance reading #14 | 0.664 | 0.687 |
| Avg. solar reflectance | 0.655 | 0.702 |

As can be seen from the data in Table 2, the reflective fillers significantly improve the solar reflectance of the membranes and also greatly enhance the visual appearance of the membrane.

Example 3

Roofing shingles were filled with various types of colored sand particles. Table 3 describes the CIELAB (1976) Color Space parameters of the various sand particles.

TABLE 3

|  | Color | | |
| --- | --- | --- | --- |
| Description of Particles | L* | a* | b* |
| white sand | 93.36 | −0.43 | 4.58 |
| brown colored sand | 27.8 | 10.47 | 9.11 |
| blue colored sand | 35.65 | −11.52 | −30.69 |
| green colored sand | 41.41 | −13.4 | 16.36 |
| red colored sand | 30.34 | 24.95 | 17.29 |
| yellow colored sand | 54.59 | 16.1 | 47.52 |

12 shingles at a size of 4"×4" (CertainTeed Landmark, available form Portland, Oreg., Samples 1-6 taken from CertainTeed Landmark Solaris Platinum in Coastal Tan color, Samples 7-12 taken from CertainTeed Landmark in Stonegate Gray color) were measured before filling the exposed bitumen layer with sand particles using a Labscan XE colorimeter from HunterLab Inc. The solar reflectance of the samples were also measured using a solar reflectometer (Model SSR from Devices and Services, Dallas, Tex.). Table 4A depicts the result of the samples prior to applying the sand particles.

TABLE 4A

| Sample | Color before filling | | | Solar Reflectance |
| --- | --- | --- | --- | --- |
|  | L* | a* | b* |  |
| 1 | 63.03 | 5.44 | 10.14 | 0.369 |
| 2 | 61.94 | 6.96 | 11.31 | 0.352 |
| 3 | 62.02 | 7.45 | 11.75 | 0.373 |
| 4 | 62.75 | 4.65 | 9.89 | 0.365 |
| 5 | 61.96 | 7.78 | 12.05 | 0.373 |
| 6 | 66.28 | 4.52 | 8.83 | 0.390 |
| 7 | 38.97 | −1.34 | 2.68 | 0.205 |
| 8 | 41.23 | −0.99 | 3.92 | 0.220 |
| 9 | 41.13 | −1.22 | 3.51 | 0.222 |
| 10 | 41.47 | −1.27 | 3.50 | 0.220 |
| 11 | 39.10 | −1.33 | 2.52 | 0.210 |
| 12 | 41.02 | −0.94 | 3.96 | 0.222 |

The samples were then heated in an oven at 60° C. for 2 hours to soften the asphalt. Various sand particles with size ranging from US #20 mesh to US #100 mesh were then deposited onto the granulated surface. The particles were then pressed into the granule gaps and into the asphalt a 20-lb roller. Excess particles were then removed by flipping the sample upside down. The particles studied included white sand (obtained form Maryland Refractories, Irondale, Ohio), and brown, blue, red, and yellow sand (each obtained from Trowel-Rite from Clifford Estes Co., Totowa, N.J.). After the filling, the color space and the solar reflectance were measured again as described above. The amount of particles applied were recorded by measuring the weight difference of the sample before and after the filling. ΔE* was calculated using the following equation where the $L^*_1$, $a^*_1$, and $b^*_1$ are the CIELAB (1976) color parameter before the filling and $L^*_2$, $a^*_2$, and $b_2^*$ are the color parameter after the filling.

$$\Delta E^* = \sqrt{(L^*_2 - L^*_1)^2 + (a_2^* - a^{*1})^2 + (b^*_2 - b^*_1)^2}$$

Table 4B depicts the results of the measurements after filling, the amounts of particles used on the 4"×4" samples and the ΔE* values.

TABLE 4B

| Sample | Color of particles | Color after filling | | | Solar Reflectance | Amount of particles/g | ΔE* |
| --- | --- | --- | --- | --- | --- | --- | --- |
|  |  | L* | a* | b* |  |  |  |
| 1 | white | 70.90 | 4.10 | 7.90 | 0.443 | 0.59 | 8.31 |
| 2 | brown | 59.80 | 7.10 | 10.90 | 0.332 | 0.74 | 2.23 |
| 3 | blue | 60.90 | 5.60 | 8.40 | 0.371 | 0.46 | 4.00 |
| 4 | green | 62.90 | 2.00 | 10.70 | 0.387 | 0.86 | 2.73 |
| 5 | red | 60.90 | 8.00 | 11.50 | 0.370 | 0.65 | 1.22 |
| 6 | yellow | 66.60 | 5.90 | 13.10 | 0.421 | 0.72 | 4.51 |
| 7 | white | 49.70 | −1.10 | 1.50 | 0.274 | 0.53 | 10.75 |
| 8 | brown | 40.40 | 0.20 | 4.50 | 0.210 | 0.99 | 1.56 |
| 9 | blue | 41.00 | −2.40 | 0.00 | 0.230 | 0.72 | 3.72 |
| 10 | green | 42.30 | −3.60 | 6.10 | 0.243 | 1.06 | 3.63 |
| 11 | red | 38.40 | 1.50 | 3.70 | 0.221 | 1.02 | 3.17 |
| 12 | yellow | 43.20 | 0.60 | 8.00 | 0.241 | 0.80 | 4.79 |

When comparing Tables 4A and 4B, the filling with sand particles maintain or enhance the solar reflectance by covering the exposed asphalt area of the unfilled shingles. Moreover, for ΔE* of less than 3.0, the shingles final color appearance is unchanged from the unfilled shingle, while ΔE* of 3.0 and higher indicate a different color, i.e., the sand particles provide an undertone color to the unfilled shingle. Therefore, the filling permits to either maintain the color of the shingle or to adjust the undertone color to provide another desirable color to the shingle.

In still other embodiments, a roofing product comprises a substrate having a bitumen layer; roofing granules on a majority of the bitumen layer, such that an exposed portion of the bitumen layer does not have the roofing granules; and reflective particles on the exposed portion of the bitumen layer, and the reflective particles are smaller in size than the roofing granules.

The reflective particles may have a solar reflectance of greater than 40%. The solar reflectance of the reflective particles may be greater than about 50%, greater than about 60%, or greater than about 70%. The solar reflectance of the reflective particles may be less than about 100%, less than about 90%, or less than about 80%.

The roofing granules may be on about 80% to 95% of the bitumen layer, and the reflective particles may cover substantially all of the exposed portion of the bitumen layer. The roofing product may have a solar reflectance of greater than about 70%, or greater than about 72%, or even greater than about 75%. The roofing granules may have a solar reflectance of greater than about 40%, greater than about 50%, greater than about 60%, or even greater than about 70%. The solar reflectance of the roofing granules may be less than about 75%, less than about 74%, less than about 70%, or between about 70% and about 74%.

In an embodiment, the roofing granules may have a particle size between #8 and #50 U.S. mesh. Exemplary roofing granules include roofing granules with a particle size between #10 and #40 U.S. mesh, or algae-resistant roofing granules, both available from CertainTeed Corporation of Piedmont, Mo., USA.

The particles may have a particle size less than #50 U.S. mesh. The reflective particles may have a particle size less than #100 U.S. mesh, in a range from #30 U.S. mesh to larger than #100 U.S. mesh, or from #40 to #80 U.S. mesh, or from #30 to #60 U.S. mesh.

The particles may comprise at least one of crushed quartz granules, crushed calcites, ceramic particles, crushed ceramic grog, sintered clay particles, $TiO_2$ particles, infrared reflective pigments, calcined clays, zinc oxide particles, reflective polymer particles, reflective glass spheres, retro-reflective glass beads, reflective mica or thin film coated mica, heat reflective particles, metal flakes, metal particles, metal spheres and colored mineral particles. The reflective particles may further comprise at least one of an algaecide, fungicide, biocide, UV blocking, color, photocatalyst and metallic appearance.

Additional embodiments may comprise a method of fabricating a roofing shingle comprising: coating a substrate with a bitumen layer; depositing roofing granules on the bitumen layer of the substrate; pressing the roofing granules into the bitumen layer, such that an exposed portion of the bitumen layer is not covered by the roofing granules to form a subassembly; turning the subassembly on a roller such that the subassembly is curved and spaces between the roofing granules are widened; and depositing reflective particles on the widened spaces of the exposed portion of the bitumen layer. The reflective particles may be smaller than the roofing granules. Deposition of the reflective particles may occur before the roofing granules are pressed, and before cooling.

The method may further comprise pressing the reflective particles into the bitumen layer to form an assembly and cooling the assembly. The reflective particles may be deposited via gravity feed or electrostatically deposited, wherein during reflective particle deposition, the bitumen layer may face downward and the reflective particles are drawn upward to the bitumen layer. The reflective particles may be deposited before or after a first turning roller. The method may further comprise recovering at least some of the reflective particles after deposition, which may be performed via vacuum pickup or catch pan after a roller.

In still other versions, the reflective particles may be dispersed in a liquid media and then deposited. The liquid media may comprise at least one of water, latex, acrylic emulsion and a solvent-based coating. The liquid media may have an additive comprising at least one of a dispersant, viscosity modifier and biocide. In addition, the reflective particles may further comprise at least one of an algaecide, fungicide, biocide, UV blocker, color, and metallic appearance.

In yet another embodiments, a roofing product includes a substrate having a binder layer; roofing granules on a majority of the binder layer, such that an exposed portion of the binder layer does not have the roofing granules; and reflective particles on the exposed portion of the binder layer, the reflective particles are smaller in size than the roofing granules, and the reflective particles have a solar reflectance of greater than 40%.

The binder layer may comprise adhesive, acrylic, foamed acrylic, highly-filled acrylic, acrylate, alkyd, bitumen, polyester, polymer foam, epoxy, urethane, bioasphalt and a combination thereof. The binder layer may be non-bituminous. The substrate may include a metal, a fibrous web, a polymer tile, or a clay tile. The roofing granules may be on about 80% to 95% of the binder layer, and the reflective particles may cover substantially all of the exposed portion of the binder layer.

The roofing product may have a solar reflectance of greater than about 70%, or greater than about 72%, or greater than about 75%. The roofing granules may have a particle size between #8 and #50 U.S. mesh, and the reflective particles may have a particle size in a range of #30 and #100 U.S. mesh. The roofing granules may have a particle size between #10 and #40 U.S. mesh, and the reflective particles may have a particle size in a range of #40 to #60 U.S. mesh. The reflective particles may have a particle size in a range from #30 to #60 U.S. mesh. The reflective particles may have a particle size between #50 and #80 U.S. mesh.

The solar reflectance of the reflective particles may be greater than about 50%, greater than about 60%, or even greater than about 70%. The solar reflectance of the reflective particles may be less than about 100%, less than about 90%, or even less than about 80%.

The roofing granules may have a solar reflectance of greater than about 40%, greater than about 50%, greater than about 60%, or even greater than about 70%. The solar reflectance of the roofing granules may be less than about 75%, less than about 74%, or even less than about 70%. The solar reflectance of the roofing granules may be between about 70% and about 74%.

In an alternate embodiment, a method of fabricating a roofing product includes coating a substrate with a binder layer; depositing roofing granules on the binder layer of the substrate; pressing the roofing granules into the binder layer, such that an exposed portion of the binder layer is not covered by the roofing granules to form a subassembly; turning the subassembly on a roller such that the subassembly is curved and spaces between the roofing granules are widened; and depositing reflective particles on the widened spaces of the exposed portion of the binder layer, and the reflective particles are smaller than the roofing granules. Coating the substrate with a binder layer may comprise coating the substrate with a non-bituminous layer. Deposition of the reflective particles may occur before the roofing granules are pressed.

The method may further comprise pressing the reflective particles into the binder layer to form an assembly and cooling the assembly. The reflective particles may be deposited before cooling. The reflective particles may be deposited via gravity feed, or the reflective particles may be electrostatically deposited. During reflective particle deposition, the binder layer may face downward and the reflective particles may be drawn upward to the binder layer. The method may further comprise recovering at least some of the reflective particles after deposition. At least some of the reflective particles may be recovered via vacuum pickup or catch pan after a roller.

The reflective particles may be dispersed in a liquid media and then deposited. The liquid media may comprise at least one of water, latex, acrylic emulsion and a solvent-based coating. The liquid media may have an additive comprising at least one of a dispersant, viscosity modifier and biocide.

In other embodiments, the reflective particles may further comprise at least one of an algaecide, fungicide, biocide, UV blocker, color, and metallic appearance. The roofing product may be selected from the group consisting of membranes and shingles.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A roofing product, comprising:
a substrate having a bitumen layer;
roofing granules on a majority of the bitumen layer, such that an exposed portion of the bitumen layer does not have the roofing granules; and
particles on the exposed portion of the bitumen layer in an amount of 0.02 $g/in^2$ to 0.2 $g/in^2$, wherein the particles are smaller in average size than the roofing granules and the particles have a solar reflectance of greater than 10% and not greater than 45%, wherein a major surface of the roofing product has a $\Delta E^*$ of less than 3.0 compared to an analogous major surface of a roofing product lacking particles, wherein the roofing granules are on about 80% to 95% of the bitumen layer, and the particles cover substantially all of the exposed portion of the bitumen layer, wherein two of the roofing granules are separated by a nominal distance $w_1$ and the particles are applied between the two roofing granules at a distance $w_2$, wherein $w_2 > w_1$, wherein the particles and the roofing granules are disposed in the bitumen layer at a press distance $w_p$ and $w_2 > w_p > w_1$, and wherein the particles comprise a different material than the roofing granules.

2. The roofing product according to claim 1, wherein the particles comprise at least one of crushed quartz granules, crushed calcites, ceramic particles, crushed ceramic grog, sintered clay particles, $TiO_2$ particles, infrared reflective pigments, calcined clays, ZnO particles, reflective polymer particles, reflective glass spheres, retro-reflective glass beads, reflective mica or thin film coated mica, heat reflective particles, metal flakes, metal particles, metal spheres and colored mineral particles.

3. The roofing product according to claim 1, wherein the reflective particles have an opacity greater than 50%.

4. The roofing product according to claim 1, wherein the roofing product has a color according to the formula:
$-(L^*)+[((L_o^*)+(y(a^*)^2+z(b^*)^2)^{1/2}/x] \leq 0$, wherein $L^*$, $a^*$, $b^*$ are 1976 CIELAB color space parameter of the roofing product, and $L_o^* > 50$, $x \geq 1$, $y \geq 1$, and $z \geq 1$.

5. The roofing product of claim 1, wherein the particles and roofing granules have different solar reflectance as compared to one another.

6. The roofing product according to claim 1, wherein the particles have a color according to the formula:
$-(L^*)+[((L_o^*)+(y(a^*)^2+z(b^*)^2)^{1/2}/x] \leq 0$, wherein $L^*$, $a^*$, $b^*$ are 1976 CIELAB color space parameter of the roofing product, and $L_o^* > 50$, $x \geq 1$, $y \geq 1$, and $z \geq 1$.

7. The roofing product according to claim 1, wherein the particles are non-white.

8. A roofing product, comprising:
a substrate having a bitumen layer;
roofing granules on a majority of the bitumen layer, such that an exposed portion of the bitumen layer does not have the roofing granules; and
particles on the exposed portion of the bitumen layer in an amount of 0.02 g/in² to 0.2 g/in², the particles are smaller in average size than the roofing granules, and the particles have a solar reflectance of greater than 10% and not greater than 40%, wherein a major surface of the roofing product has a ΔE* of greater than 3.0 and less than 11.5 compared to an analogous major surface of a roofing product lacking particles, wherein the roofing granules are on about 80% to 95% of the bitumen layer, and the particles cover substantially all of the exposed portion of the bitumen layer, wherein two of the roofing granules are separated by a nominal distance $w_1$ and the particles are applied between the two roofing granules at a distance $w_2$, wherein $w_2 > w_1$, wherein the particles and the roofing granules are pressed into the bitumen layer concurrently at a press distance $w_p$ and $w_2 > w_p > w_1$, wherein the roofing product has an increase in solar reflectance compared to the roofing product without the particles between 7.9% and 33.7%, and wherein the particles and roofing granules have different solar reflectance as compared to one another.

9. The roofing product according to claim 8, wherein the particles comprise at least one of crushed quartz granules, crushed calcites, ceramic particles, crushed ceramic grog, sintered clay particles, $TiO_2$ particles, infrared reflective pigments, calcined clays, ZnO particles, reflective polymer particles, reflective glass spheres, retro-reflective glass beads, reflective mica or thin film coated mica, heat reflective particles, metal flakes, metal particles, metal spheres and colored mineral particles.

10. The roofing product according to claim 8, wherein the particles have an opacity greater than 50%.

11. The roofing product according to claim 8, wherein the roofing granules and the particles comprise different materials as compared to one another.

12. The roofing product according to claim 8, wherein the roofing product has a color according to the formula:
$(L^*)+[((L_o^*)+(y(a^*)^2+z(b^*)^2)^{1/2}/x] \leq 0$, wherein $L^*$, $a^*$, $b^*$ are 1976 CIELAB color space parameter of the roofing product, and $L_o^* > 50$, $x \geq 1$, $y \geq 1$, and $z \geq 1$.

13. The roofing product according to claim 8, wherein the particles have a color according to the formula:
$-(L^*)+[((L_o^*)+(y(a^*)^2+z(b^*)^2)^{1/2}/x] \leq 0$, wherein $L^*$, $a^*$, $b^*$ are 1976 CIELAB color space parameter of the roofing product, and $L_o^* > 50$, $x \geq 1$, $y \geq 1$, and $z \geq 1$.

14. The roofing product according to claim 8, wherein the particles are non-white.

* * * * *